(12) United States Patent
Popuveniuc et al.

(10) Patent No.: US 10,460,114 B1
(45) Date of Patent: Oct. 29, 2019

(54) IDENTIFYING VISUALLY SIMILAR TEXT

(71) Applicant: Amazon Technologies, Inc., Reno, NV (US)

(72) Inventors: Stefan Popuveniuc, Alexandria, VA (US); Peter Zachary Bowen, Bainbridge Island, WA (US); Alexander Edward Schoof, Herndon, VA (US); Andrew Jeffrey Doane, Vienna, VA (US); Todd Lawrence Cignetti, Ashburn, VA (US); Robert Eric Fitzgerald, Herndon, VA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 16/186,351

(22) Filed: Nov. 9, 2018

Related U.S. Application Data (63) Continuation of application No. 14/469,488, filed on Aug. 26, 2014, now Pat. No. 10,127,388.

(51) Int. Cl.
  *G06F 21/60* (2013.01)
  *G06F 21/64* (2013.01)
  *H04L 29/12* (2006.01)

(52) U.S. Cl.
  CPC .............. *G06F 21/60* (2013.01); *G06F 21/64* (2013.01); *H04L 61/3025* (2013.01); *G06F 2221/2119* (2013.01)

(58) Field of Classification Search
  CPC .......... G06F 21/00; G06F 21/60; G06F 21/62; G06F 21/64; H04L 61/30; H04L 61/3005; H04L 61/3015; H04L 61/302; H04L 61/3025; H04L 63/00; H04L 63/08; H04L 63/0823; H04L 63/14; H04L 63/1408; H04L 63/1416; H04L 63/1441; H04L 63/1466; H04L 63/1483
  See application file for complete search history.

(56) References Cited

U.S. PATENT DOCUMENTS

| | | |
|---|---|---|
| 2009/0094677 A1 | 4/2009 | Pietraszek et al. |
| 2015/0100507 A1 | 4/2015 | Levac et al. |

OTHER PUBLICATIONS

Davis et al., UTR # 36 Unicode Security Considerations, 2008, www.unicode.org, pp. 1-27.
Davis et al. (Editors), UTS #39, 2013, Unicode Security Mechanisms, www.unicode.org, pp. 1-21.

*Primary Examiner* — Jung W Kim
*Assistant Examiner* — Adrian Stoica
(74) *Attorney, Agent, or Firm* — BakerHostetler

(57) ABSTRACT

Techniques are disclosed for mitigating against registering a domain name that is confusingly similar to a pre-existing domain name, possibly for the purpose of fooling users. In embodiments, a domain name is presented for registration. The domain name is rendered as an image, and optical character recognition is performed on the image to extract the rendered text. This extracted text is compared against a list of domain names for which confusingly similar domain names cannot be registered, and when the extracted text matches a domain name in this list of domain names, registration of the domain name is denied.

20 Claims, 7 Drawing Sheets

IDENTIFYING VISUALLY SIMILAR TEXT

CROSS REFERENCE TO RELATED APPLICATIONS

The present application is a continuation of, and claims priority to U.S. patent application Ser. No. 14/469,488, entitled "IDENTIFYING VISUALLY SIMILAR TEXT", filed Aug. 26, 2014, the entirety of which is hereby incorporated by reference.

BACKGROUND

There are domain names, such as example.com, that are used to access web sites, among other purposes. These domain names may be registered (acquired by an entity so that entity controls the domain name to the exclusion of others), and certificates may be acquired for them (where a certificate provides evidence that a given domain name has been validated by an authority as being trustworthy).

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

There are problems with current techniques for registering and acquiring certificates for domain names that lie in the wide variety of character sets that may be used for a domain name. That is, two domain names may be technically different because they use different characters, but they may appear to the human eye as being the same, because people may have difficulty distinguishing between characters that are from different character sets. For example, the Latin small 'a' and the Cyrillic small 'a' characters (in a Unicode text encoding format, U+0061 and U+0430, respectively) may look to be identical to the human eye. So, two domain names, one which uses the Latin small 'a' and the other which uses the Cyrillic small 'a', may appear identical to the human eye, even though they are different, and even though comparing the characters in a Unicode (or similar) representation may show them to be different.

For example, the domain name "example.com" may appear to be the same to a user, regardless of whether a Latin small 'a' or a Cyrillic small 'a' is used. And these domain names are different when viewed in their Unicode format:

example.com with a Latin small 'a': \u0065 \u0078 \u0061 \u006d \u0070 \u006c \u0065 \u002e \u0063 \u006f \u006d example.com with a Cyrillic small 'a': \u0065 \u0078 \u0430 \u006d \u0070 \u006c \u0065 \u002e \u0063 \u006f \u006d where the third character in each Unicode string, which corresponds to which type of a small 'a' is used, differs between the two Unicode representations of the domain names.

And there are problems associated with people being able to register confusingly similar domain names. An attacker could provide an unsuspecting user with a link to what appears to be a well-known domain name (e.g., example.com) in an email even though it is actually a confusingly-similar domain name, and if the user clicks on the link, the user may be directed to the attacker's own website instead.

Current techniques that compare domain names bit-by-bit (e.g., in a Unicode representation) are insufficient to protect users because they are able to identify differences between domain names that users are unable to identify themselves by visual inspection. And maintaining a list of confusingly similar characters may also be insufficient, because it would likely be manually maintained, and this maintenance would be ongoing as the set of characters that may be used for domain names is generally increasing.

Instead, the present techniques involve an attempt to use computers to recognize confusingly similar domain names from a similar perspective that users encounter confusingly similar domain names—whether the domain names are visually confusingly similar when rendered as an image. In embodiments, an entity attempts to register or obtain a certificate for a domain name. This domain name is rendered as an image (e.g., a bitmap image of rendered text corresponding to the domain name is created). Optical character recognition (OCR) is then performed on this rendered image, to extract text from the rendered image. At this stage, the OCR will generally recognize confusingly-similar characters as being the same character—e.g., the OCR may process both a rendered Latin small 'a' and Cyrillic small 'a' in a similar matter to extract a Latin small 'a' in both cases.

Once the text has been extracted from the image via OCR, the text may be compared against a list of domain names. Where this text matches one of the lists of domain names, it may be considered that the domain name corresponding to the text is confusingly similar to another domain name, and registering or acquiring a certificate for the domain name should be denied. In embodiments, this blacklist for confusingly similar domain names may be a list of large websites, such as the Alexa top-500 websites listing. This may be because attacks are more likely to be made with domain names that are confusingly similar to these domain names, since they have large amounts of users visiting them anyway, and/or to reduce the processing resources involved with evaluating the domain name-under-consideration against a much larger list of domain names. In other embodiments, the blacklist of domain names may be as large as a list of all registered domain names.

Figure 1:
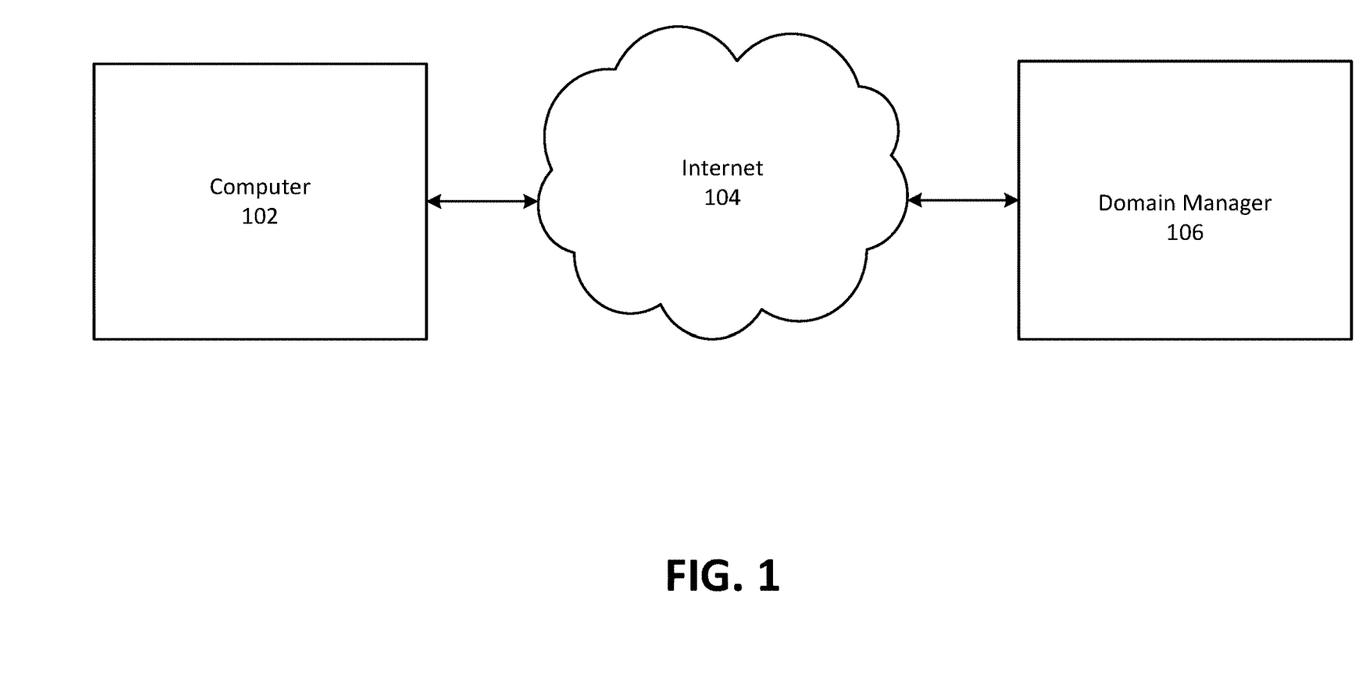
FIG. 1 depicts an example operating environment in which embodiments may be implemented.

FIG. 1 depicts an example operating environment in which embodiments may be implemented. As depicted, computer 102 and domain name manager 106 are connected via Internet 104. In embodiments, each of computer 102 and domain name manager 106 may be implemented on computer 700 of FIG. 7, which depicts a computer in greater detail.

It may be that computer 102 attempts to perform an operation relating to a domain name, and whether this domain name operation is permitted, is determined by domain name manager 106. For example, computer 102 may attempt to register a domain name, where domain name manager 106 is a domain name registrar. Or, computer 102 may already have registered a domain name, and may attempt to obtain a security certificate for that domain name from domain name manager 106. In these scenarios, domain name manager 106 may implement some or all of the operating procedures depicted in FIGS. 2-5 to determine whether to allow the requested operation for the domain name.

In other embodiments, computer 102 may determine whether to present a uniform resource locator (URL, which contains a domain name) to a user or access a resource located at that URL. In these embodiments, computer 102 may implement the operating procedures of FIG. 6 to determine whether to present or access the URL.

Figure 2:
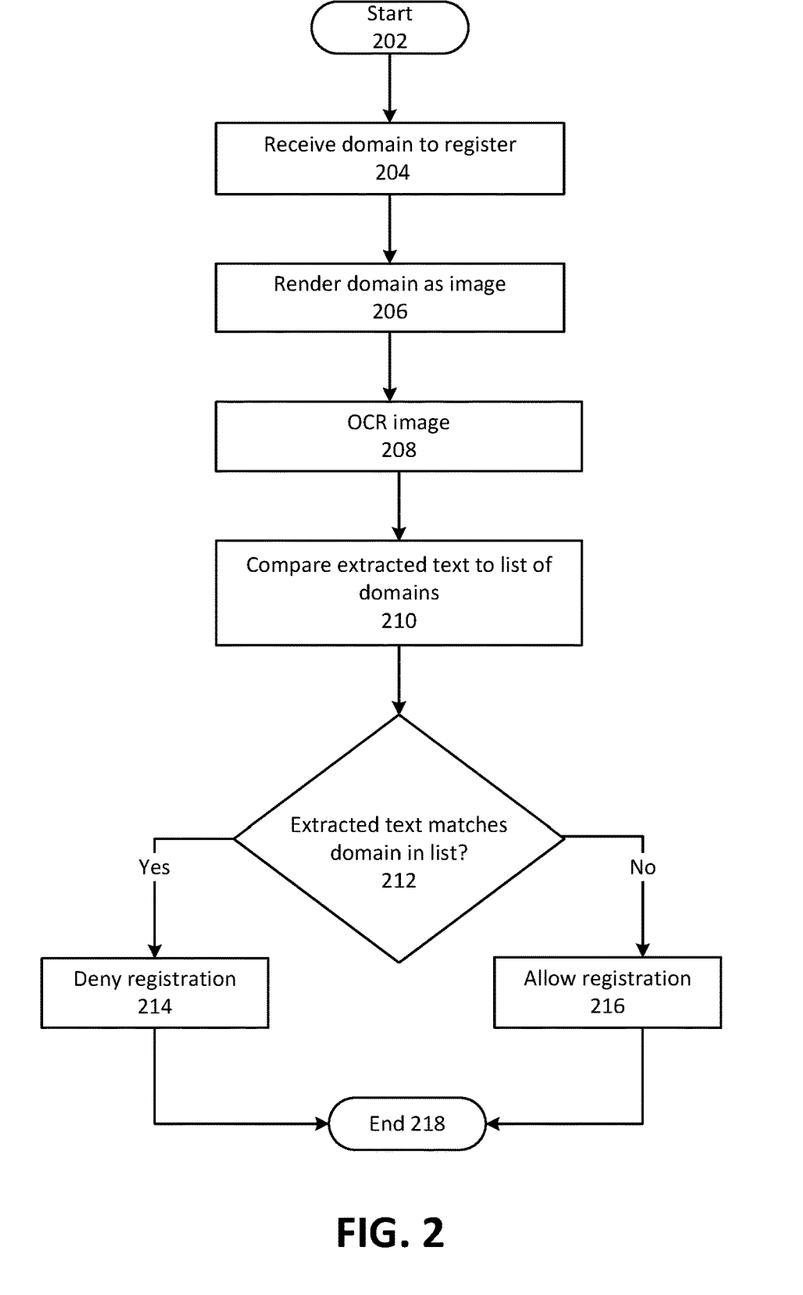
FIG. 2 depicts example operating procedures for identifying visually similar domain names.

FIG. 2 depicts example operating procedures for identifying visually similar domain names. In embodiments, the operating procedures of FIG. 2 may be implemented by domain name manager 106 of FIG. 1 as it receives a request to register a domain name from computer 102.

Figure 3:
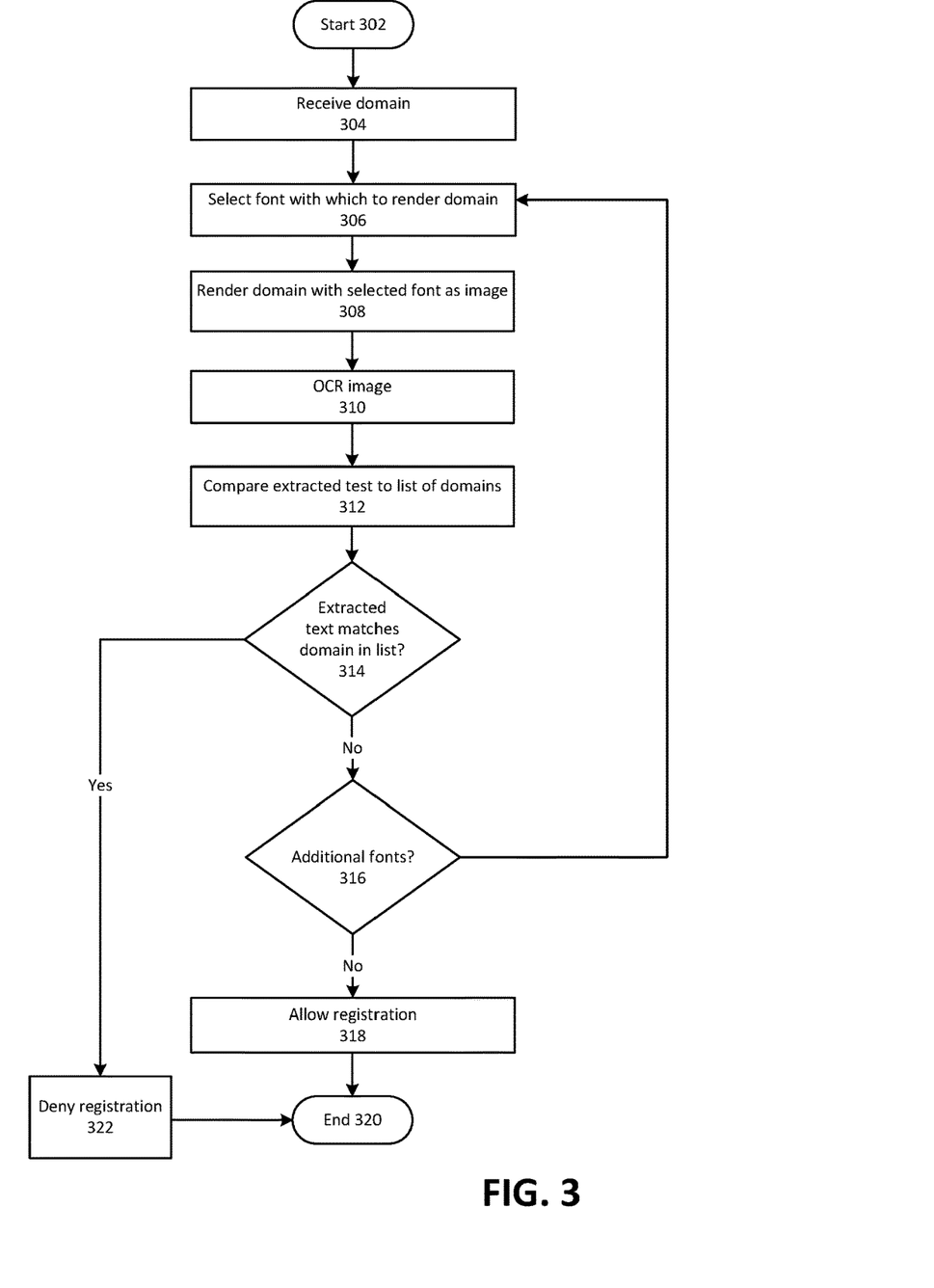
FIG. 3 depicts example operating procedures for identifying visually similar domain names using multiple fonts.
Figure 4:
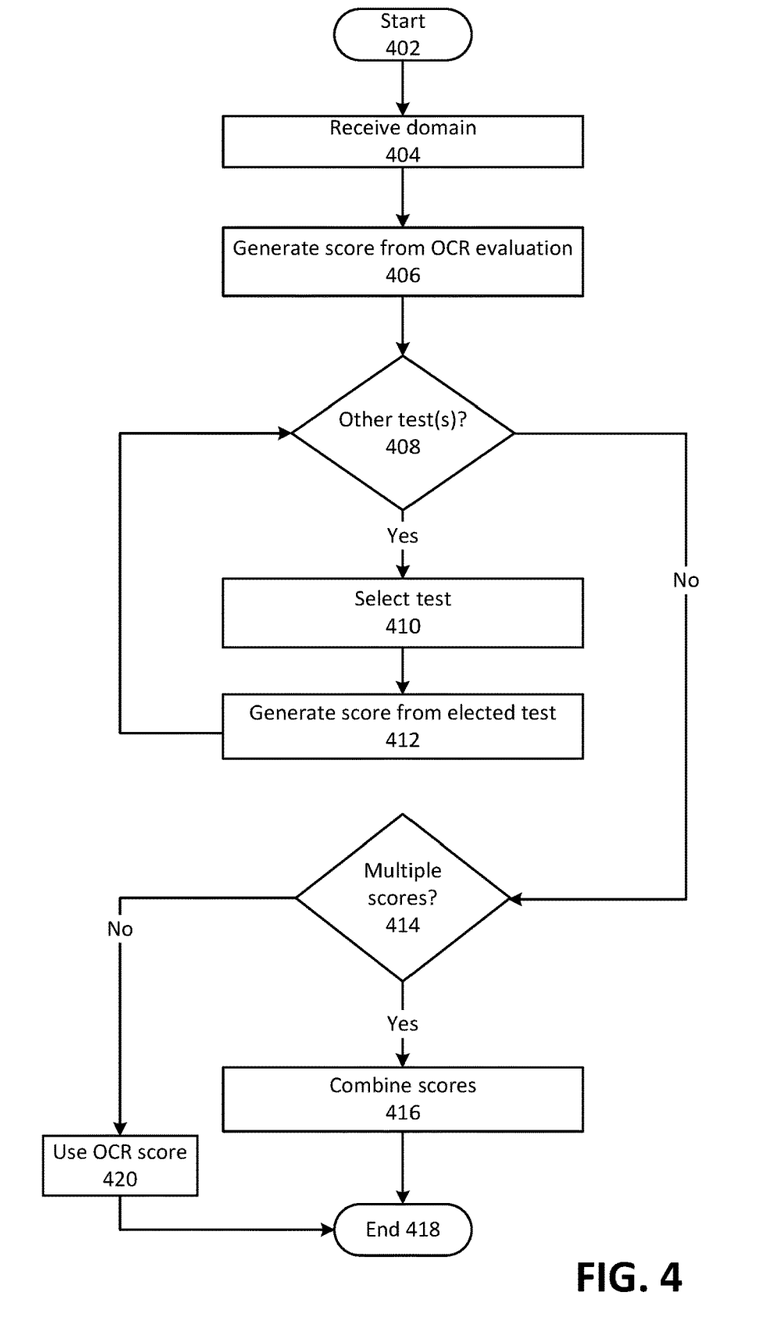
FIG. 4 depicts example operating procedures for identifying visually similar domain names using multiple types of tests.
Figure 5:
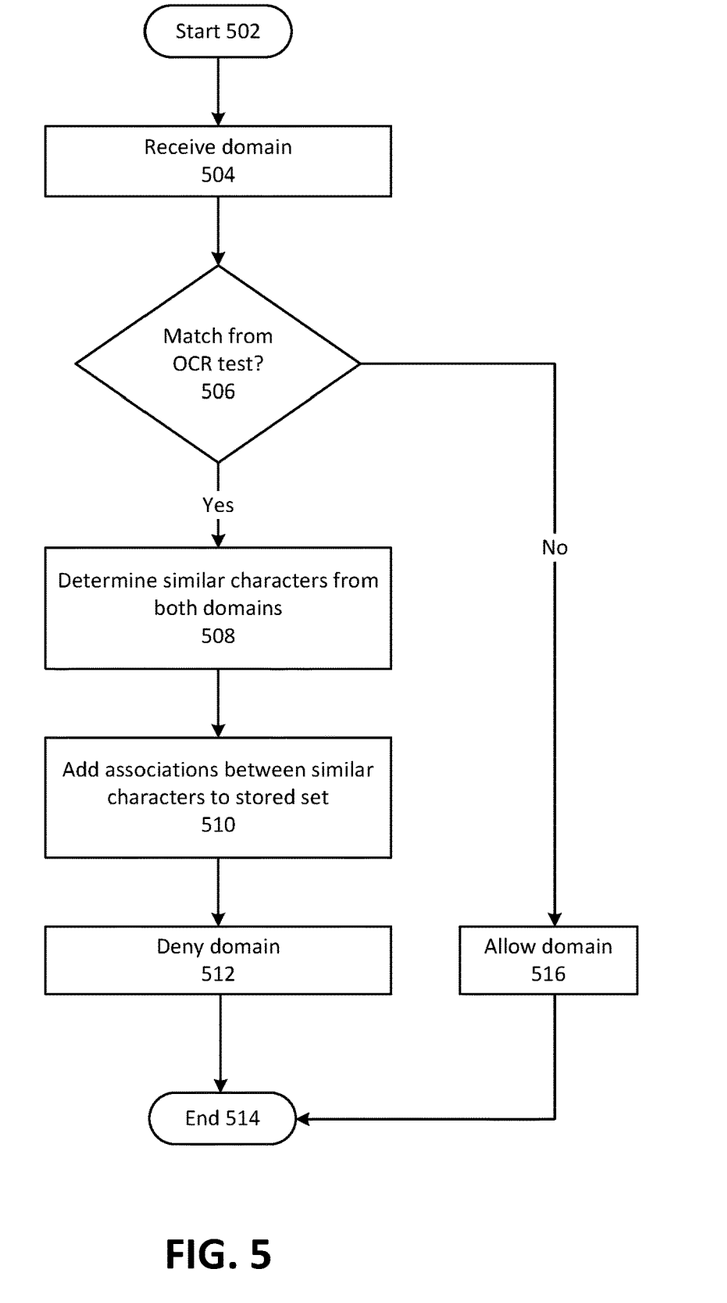
FIG. 5 depicts example operating procedures for identifying a visually similar domain names using optical character recognition to identify visually similar characters that are used in other tests.

It may be appreciated that there are embodiments that implement more, or fewer, operations than are depicted in FIG. 2 (or FIGS. 3-6), or that implement the operations in a different order than are depicted in FIG. 2 (or FIGS. 3-6). For example, considering embodiments that do not implement every operation depicted in a FIG., there may be embodiments that do not implement operation 204 of FIG. 2 (for example, because the domain name to be tested is in a predetermined list of domain names). Then, for example, considering embodiments that implement the operations depicted in a FIG. in a different order than is depicted, there may be embodiments where operation 512 of FIG. 5 is implemented before operation 508.

While the embodiments described herein primarily concern registering domain names, it may be appreciated that they may apply to other techniques for validating domain names. For example, these techniques may apply to determining whether to issue a certificate for a domain name that is being or already has been registered. Or, these techniques may apply to a web browser or email program or the like that determines whether to access a resource indicated by a link, such as when a user clicks on a URL (where a URL may comprise a domain name; for example, the URL may be http://www.example.com/index.html, where the domain name in that URL is example.com).

The operating procedures of FIG. 2 begin with operation 202 and move to operation 204. Operation 204 depicts receiving a domain name to register. This may comprise, for example, domain name manager 106 of FIG. 1 receiving an indication of a domain name from computer 102 across Internet 104 via a user interface element in a web page. In embodiments, operation 204 may comprise receiving a request to register or issue a certificate for a first domain name. After operation 204, the operating procedures of FIG. 2 move to operation 206.

Operation 206 depicts rendering the received domain name as an image. This may comprise, for example, taking a string of binary bits that represents the domain name (such as a binary representation of the domain name expressed in a Unicode format) and generating an image from this string of bits that could be displayed on a monitor, such as a bitmap image. In embodiments, operation 206 may comprise rendering the first domain name as an image. After operation 206, the operating procedures of FIG. 2 move to operation 208.

Operation 208 depicts OCR'ing the image. OCR techniques may generally take an image, identify whether there is any representation text in that image (e.g., the image is an image of a page of a book), and if so, recognize and extract that text, producing a string of text that corresponds to the characters represented in the image. The accuracy of OCR techniques may depend on factors such as the font with which the text is rendered in an image. For example, a particular font may express a particular character in a way that is more or less similar to another character, relative to the way that is handled in another font. In another example, a particular font may change the kerning—space between letters—relative to another font, so that performing OCR on text in one font may identify the separate characters "r" and "n" in "rn," but another performing OCR on text in another font where the kerning causes the "r" and "n" in "rn" to appear very similar to a "m." In other embodiments, a ligature—a connection between two characters when rendered in a font—may cause those characters to look like another character or characters.

In embodiments, visually similar characters between two domain names may occur where the extracted text may be found in the set of domain names for which confusingly similar domain names are checked against. The domain name comprises a first character in a first character set that is rendered to be visually similar to a second character in a second character set of a domain name in the set of domain names. In embodiments, kerning may cause one or more characters to look like one or more other characters where the extracted text may be found in the set of domain names when confusingly similar domain names are checked against where the domain name comprises at least two characters that, based on a kerning between them when rendered, are visually similar to at least one character of a domain name in the set of domain names.

In embodiments, OCR parameters may be set based on a language likely to be used by users (such as those users likely to access a domain name—e.g., users in Canada for a domain name that ends in .ca), and this may be determined based on a user profile or the user's geographical location (such as determined based on Internet Protocol (IP) address). These embodiments may comprise determining a language used by a user who would access the domain name; and performing OCR on the image based on the language. In embodiments, the language is determined based on a geographical location of the user who would access the domain name, or a stored preference of the user who would access the domain name. In embodiments, operation 208 may comprise performing OCR on the image to extract text from the image, the extracted text corresponding to the first domain name. After operation 208, the operating procedures of FIG. 2 move to operation 210.

Operation 210 depicts comparing the extracted text from OCR'ing the image in operation 208 to a list of domain names. This may comprise taking the computer-readable representation of the extracted text (e.g., a set of Unicode characters or a string of bits), and comparing that to a list of domain names that are stored in an equivalent manner. This list of domain names may be a list of the most popular domain names (since those may be the domain names that others try to register confusingly similar domain names for), or it may be a list as large as all registered domain names. After operation 210, the operating procedures of FIG. 2 move to operation 212.

Operation 212 depicts determining whether the comparison of the extracted text to the list of domain names in operation 210 indicates that the extracted text matches a domain name in the list. In embodiments, operation 212 may comprise determining whether the extracted text is found in a set of domain names for which confusingly similar domain names cannot be registered or issued the certificate. It may be determined that the extracted text matches a domain name in the list where the string of characters for the extracted text is the same as the string of characters for any domain name in the list.

Where in operation 212 it is determined that the comparison of the extracted text to the list of domain names in operation 210 indicates that the extracted text matches a domain name in the list, the operating procedures of FIG. 2 move to operation 214. Instead, where in operation 212 it is determined that the comparison of the extracted text to the list of domain names in operation 210 indicates that the extracted text does not match a domain name in the list, the operating procedures of FIG. 2 move to operation 216.

Operation 214 is reached from operation 212 where it is determined that the comparison of the extracted text to the list of domain names in operation 210 indicates that the extracted text matches a domain name in the list. Operation 214 depicts denying registration of the domain name. In embodiments, this may comprise a user of computer 102 attempting to register a domain name by inputting the requested domain name into a form in a web page served by domain name manager 106. Then, denying registration may comprise domain name manager 106 sending computer 102 a second web page that indicates that registering that domain name will not be allowed, and offering to register a different domain name instead. In embodiments, operation 214 may comprise denying registration or issuance of the certificate for the first domain name when the extracted text is found in the set of domain names for which confusingly similar domain names cannot be registered or issued the certificate.

In embodiments, operation 214 may comprise raising an alert regarding registering the domain, such as by sending the proposed domain name to an employee of the domain manager so that he or she may evaluate the domain name to determine whether it is confusingly similar to a human. As used herein, it may be appreciated that, where it is discussed that an operation on a domain name is denied (such as a request to register a domain name), there may be embodiments were an alert is raised regarding the domain name operation. And, likewise, where it is discussed that an alert is raised regarding an operation on a domain name, this may include denying the operation on the domain name (such as denying registration of the domain name). After operation 214, the operating procedures of FIG. 2 move to operation 218, where the operating procedures of FIG. 2 end.

Operation 216 is reached from operation 212 where it is determined that the comparison of the extracted text to the list of domain names in operation 210 indicates that the extracted text does not match a domain name in the list. Operation 216 depicts allowing registration of the domain name. This may comprise, for example, registering the domain name for the requesting entity (e.g., an entity that controls computer 102), or where this is a multi-step process, proceeding to the next step in the process (e.g., requesting payment information, where there is a charge associated with registering a domain name). After operation 216, the operating procedures of FIG. 2 move to operation 218, where the operating procedures of FIG. 2 end.

FIG. 3 depicts example operating procedures for identifying visually similar domain names using multiple fonts. In embodiments, the operating procedures of FIG. 2 may be implemented by domain name manager 106 of FIG. 1 as it receives a request to register a domain name from computer 102.

The operating procedures of FIG. 3 begin with operation 302 and move to operation 304. Operation 304 depicts receiving a domain name to register. In embodiments, operation 304 may be implemented in a similar manner as operation 204 of FIG. 2. After operation 304, the operating procedures of FIG. 3 move to operation 306.

Operation 306 may be reached from operation 304, or from operation 316 where it is determined that there are additional fonts with which to render the domain name. Operation 306 depicts selecting a font with which to render the domain name. In embodiments, the domain name may be rendered with multiple fonts (and then the multiple images may be separately OCR'ed and tested to see whether there is any match of domain names among the OCR'ed text and the domain names in a list). This may be because OCR'ing text rendered with different fonts, may produce different results—given characters may appear more or less similar when rendered in one font than another.

In embodiments, the selection of fonts to render the domain name with may include fonts that are likely to be used by web browsers in rendering domain names (such as domain names in URLs), since this may be a common use case. That is, attackers may be relying on confusion by users when viewing the domain names in a web browser to get the users to think that one domain name is actually another domain name. In other embodiments, a domain name may be rendered in both upper case and lower case characters, since a domain name may be considered to be confusingly similar when rendered one way but not the other, and accessing domain names is usually case insensitive (i.e., EXAMPLE.COM and example.com are considered to be the same domain name). After operation 306, the operating procedures of FIG. 3 move to operation 308.

Operation 308 depicts rendering the domain name as an image with the font selected in operation 306. In embodiments, operation 308 may be implemented in a similar manner as operation 206 of FIG. 2. In embodiments, where operation 308 is performed multiple times to render the domain name with multiple fonts, operation 308 may comprise rendering the first domain name as a plurality of images that includes the images, the first domain name being rendered with a different font in each image of the plurality of images. After operation 308, the operating procedures of FIG. 3 move to operation 310.

Operation 310 depicts OCR'ing the image rendered in operation 308. In embodiments, operation 310 may be implemented in a similar manner as operation 208 of FIG. 2. In embodiments where the domain name is separately rendered with multiple fonts, operation 310 may comprise performing OCR on each image of the plurality of images. After operation 310, the operating procedures of FIG. 3 move to operation 312.

Operation 312 depicts comparing the text extracted from OCR'ing the image in operation 310 to a list of domain names. In embodiments, operation 312 may be implemented in a similar manner as operation 210 of FIG. 2. After operation 312, the operating procedures of FIG. 3 move to operation 314.

Operation 314 depicts determining whether the result of the comparison in operation 312 indicates that the extracted text does match a domain name in the list. In embodiments, operation 214 may be implemented in a similar manner as operation 212 of FIG. 2.

Where in operation 314 it is determined that the result of the comparison in operation 312 indicates that the extracted text does match a domain name in the list, the operating procedures of FIG. 3 move to operation 322. Instead, where in operation 314 it is determined that result of the comparison in operation 312 indicates that the extracted text does not match a domain name in the list, the operating procedures of FIG. 3 move to operation 316.

Operation 316 is reached from operation 314 where it is determined that result of the comparison in operation 312 indicates that the extracted text does not match a domain name in the list. Operation 316 depicts determining whether there are additional fonts with which to render the domain name as an image. In embodiments, the fonts with which to render the domain name as an image may be maintained as a list in a file that is traversed in order. Here, operation 316 may comprise determining whether there is another font listed in the file (there is another font with which to render the domain name as an image), or whether the end of the file has been reached (there is not another font with which to render the domain name as an image).

Where in operation 316 it is determined that there are additional fonts with which to render the domain name as an image, the operating procedures of FIG. 3 return to operation 306. Instead, where in operation 316 it is determined that there are no additional fonts with which to render the domain name as an image, the operating procedures of FIG. 3, move to operation 318.

Operation 318 is reached from operation 316 where it is determined that there are no additional fonts with which to render the domain name as an image. Operation 318 depicts allowing registration of the domain name. In embodiments, operation 318 may be implemented in a similar manner as operation 216 of FIG. 2. After operation 318, the operating procedures of FIG. 3 move to operation 320, where the operating procedures of FIG. 3 end.

Operation 322 is reached from operation 314 where it is determined that the extracted text does match a domain name in the list. Operation 322 depicts denying registration of the domain name. In embodiments, operation 322 may be implemented in a similar manner as operation 214 of FIG. 2. In embodiments, operation 322 may comprise denying registration or issuance of the certificate for the first domain name based on the presence of text extracted from the plurality of images via OCR being found in the set of domain names.

In embodiments, performing the operation on the domain name may be denied where the operations cause a match between the text from any rendered image (for any font) and a domain in the list. In other embodiments, the operation on the domain name may be denied where there is a match for a predetermined threshold number of fonts (e.g., where the domain name is separately rendered 100 times with 100 fonts, and five of those 100 times, there is a match between the extracted text and a domain in the list). After operation 322, the operating procedures of FIG. 3 move to operation 320, where the operating procedures of FIG. 3 end.

FIG. 4 depicts example operating procedures for identifying visually similar domain names using multiple types of tests. In embodiments, the operating procedures of FIG. 4 may be implemented by domain name manager 106 of FIG. 1 as it receives a request to register a domain name from computer 102.

The operating procedures of FIG. 4 begin with operation 402 and move to operation 404. Operation 404 depicts receiving a domain name. In embodiments, operation 404 may be implemented in a similar manner as operation 204 of FIG. 2. After operation 404, the operating procedures of FIG. 4 move to operation 406.

Operation 406 depicts generating a score from an OCR evaluation. In embodiments, this OCR evaluation may be implemented in a similar manner as operations 206-212 of FIG. 2. After operation 406, the operating procedures of FIG. 4 move to operation 408.

Operation 408 depicts determining whether there are any additional tests to perform on the domain name. In embodiments, the OCR evaluation may be used in conjunction with one or more other tests. Where this is the case, a list of these tests may be maintained, and traversed until the end of the list is reached. These tests are described with respect to operation 410.

Where in operation 408 it is determined that there are additional tests to perform on the domain name, the operating procedures of FIG. 4 move to operation 410. Instead, where it is determined that there are no additional tests to perform on the domain name, the operating procedures of FIG. 4 move to operation 414.

Operation 410 is reached from operation 408 where it is determined that there are additional tests to perform on the domain name. Operation 410 depicts selecting an additional test to perform. This may comprise traversing a list as described in operation 408, and selecting each test in the order it appears in the list. These other tests may include, for example, determining whether the domain name includes a combination of characters from different character sets (e.g., four of the characters are from a Latin character set, and two of the characters are from a Cyrillic character set), where using characters from multiple character sets may indicate that registration of the domain name should be denied.

In other embodiments, the test may include maintaining a list of pairs of similar-looking characters (e.g., the Latin small 'a' and the Cyrillic small 'a'), and denying registration of the domain name when each character in the proposed domain name either matches a character in the list of domain names (e.g., the first character in each domain name is Latin small 'e'), or is from a pair of similar characters (e.g., the third character in each domain name is a Latin small a and a Cyrillic small a, respectively, where these characters are considered confusingly similar). This character-by-character evaluation may be performed using a bitwise representation of the two domain names. After operation 410, the operating procedures of FIG. 4 move to operation 412.

In embodiments, operation 410 may comprise performing more stringent analysis (such as by reducing a predetermined threshold value that is to be reached for a domain name for an operation on that domain name to be denied) when that domain name contains a character that is found in other confusingly similar domain names. In embodiments, this may comprise, in response to determining to deny performing the operation on the domain name, storing an indication of at least one character used in the domain name; and in response to determining that a second domain name contains the at least one character, performing additional evaluation on the second domain name to determine whether to perform the operation on the second name relative to that of a third domain name that lacks the at least one character.

Operation 412 depicts generating a score for the domain name using the selected test. In embodiments, the result may be binary—there is a match (e.g., 1), or there is not (e.g., 0). In other embodiments, the score may be expressed more granularly, such as integers between 0 and 100, inclusive. In such a case, a lower score may indicate less of a likelihood that there is a match between the proposed domain name and a domain name in the list, and a higher score may indicate a greater likelihood that there is a match between the proposed domain name and a domain name in the list.

In an embodiment where the test involves determining whether characters are drawn from different character sets in a domain, the score may be based on the number of different character sets used, and the maximum possible score may be the total number of characters in a domain. For example, if there are seven characters in a domain, and there are three different character sets used, the score may be 3/7. In embodiments, this may be normalized to the range for other scores. For example, where other scores may range from 0 to 100, this 3/7 score may be multiplied by 100 to produce a normalized score of 100*3/7~=43.

In an embodiment where the test involves determining whether the domain involves a substitution between known-similar-looking characters, and that is its sole difference from a domain on the list, the score may be based on the number of these substitutions. In this case, the score may be based on how many characters are exactly identical between the two domains. For example, where two characters have a similar-looking analogue in a seven-character domain, the score may be 5/7 to represent that five characters are identical to a known domain. Likewise to the above, this score may be normalized to the range of other scores. After operation 412, the operating procedures of FIG. 4 return to operation 408.

Operation 414 is reached from operation 408 where it is determined that there are no additional tests to perform on the domain name. Operation 414 depicts determining whether there are multiple scores determined for the domain name using multiple tests. In embodiments, this may comprise determining whether multiple tests were performed, where each test produces a score, and thus may be performed in a similar manner as operation 408, where it is determined if there are any tests to perform in addition to the OCR evaluation.

Where in operation 414 it is determined that there are multiple scores determined for the domain name, the operating procedures of FIG. 4 move to operation 416. Instead, where in operation 414 it is determined that there are not multiple scores determined for the domain name (i.e., only the OCR evaluation of operation 406 was performed for the domain name), the operating procedures of FIG. 4 move to operation 420.

Operation 416 is reached from operation 414 where it is determined that there are multiple scores determined for the domain name. Operation 416 depicts combining the multiple scores for the domain name. In embodiments, this may comprise summing the scores, taking an average of the scores, or taking a weighted average of the scores (i.e., some tests may be more valued than others for more correctly identifying whether a domain name is confusingly similar, so its score may be valued more than others and given a greater weight in combining the multiple scores).

In embodiments, where this score is above a predetermined threshold value, it may be determined that the domain name is confusingly similar and should not be registered. In other embodiments, where any individual test results in a score that indicates that the domain name is confusingly similar, this may be sufficient to determine not to register the proposed domain name.

In embodiments, this score (either an individual score, or a combination of multiple scores) may be a confidence level that the domain name is confusingly similar with another domain name. In embodiments, processing a score as a confidence level may comprise determining a confidence level that the extracted text and the first domain name are confusingly similar; and determining to allow or deny performing the operation on the domain name based on the confidence level being above a predetermined threshold value.

In embodiments, this confidence level may indicate that the OCR is correct, or that the domain name is actually confusingly similar with another domain name. In the former case, this may involve determining a confidence level that performing the OCR on the image is correct; and determining to allow or deny performing the operation on the domain name based on the confidence level being above a predetermined threshold value. And in the latter case, this may involve determining a confidence level that the extracted text and the first domain name are confusingly similar; and determining to allow or deny performing the operation on the domain name based on the confidence level being above a predetermined threshold value. After operation 416, the operating procedures of FIG. 4 move to operation 418, where the operating procedures of FIG. 4 end.

Operation 420 is reached from operation 414 where it is determined that there are not multiple scores determined for the domain name—that is, where it is determined that the score generated from OCR evaluation in operation 406 is the only score. Operation 420 depicts using the OCR score. The OCR score may be used to determine whether to register the proposed domain name. For example, the OCR score may be binary, where it either indicates that the domain name is confusingly similar or it indicates that the domain name is not confusingly similar. Here, where the binary value that indicates that the domain name is confusingly similar is used, it may be determined not to register the domain name. In other embodiments, the OCR score may be more granular, such as indicating a confidence value of whether the domain name is confusingly similar. Where this is the case, and where the confidence value is above a predetermined threshold value, that may indicate that the domain name is too similar to register, and registration of the domain name is to be denied. After operation 420, the operating procedures of FIG. 4 move to operation 418, where the operating procedures of FIG. 4 end.

FIG. 5 depicts example operating procedures for identifying visually similar domain names using optical character recognition to identify visually similar characters that are used in other tests. In embodiments, the operating procedures of FIG. 4 may be implemented by domain name manager 106 of FIG. 1 as it receives a request to register a domain name from computer 102. The operating procedures of FIG. 5 begin with operation 502 and move to operation 504.

Operation 504 depicts receiving a domain name. In embodiments, operation 504 may be implemented in a similar manner as operation 204 of FIG. 2. After operation 504, the operating procedures of FIG. 5 move to operation 506.

Operation 506 depicts determining whether performing an OCR test on the domain name produces a match. In embodiments, this OCR test may be implemented in a similar manner as operations 206-212 of FIG. 2.

Where in operation 506 it is determined that performing the OCR test on the domain name produces a match, the operating procedures of FIG. 5 move to operation 508. Instead, where in operation 508 it is determined that performing the OCR test on the domain name produces a match, the operating procedures of FIG. 5 move to operation 508.

Operation 508 is reached from operation 506 where it is determined that performing the OCR test on the domain name produces a match. Operation 508 depicts determining similar characters from both domain names—the domain name received in operation 504, and the domain name that matched in operation 506. In embodiments, once OCR has shown the domain name to be confusingly similar, this test can be done on the domain name and the matched domain name in a bitwise fashion. Then, each character of the two domain names may be compared to its counterpart (i.e., the first character of each domain name may be compared, the second character of each domain name may be compared, etc.), and where there is a difference (i.e., the Unicode character used is different), those two different characters may be determined to be a pair of similar-looking characters. In embodiments, operation 508 may comprise determining a first character of the domain name that is confusingly similar with a second character of a second domain name in the set of domain names that matches the domain name based on a bitwise comparison of the domain name and the second domain name. After operation 508, the operating procedures of FIG. 5 move to operation 510.

Operation 510 depicts adding an association between the similar characters identified in operation 508 to a stored set of similar characters. For example, pairs of similar characters may be stored in a database. Where this is the case, the one or more pairs of similar characters identified in operation 508 may be added to the database. Then, this database may be used for additional tests on proposed domain names, such as the test involving a maintained list of similar looking characters described with respect to operation 408. For example, this additional test may comprise, in response to determining that a domain name matches a second domain name in the set of domain names based on a bitwise comparison, save for the domain name using one of the first character and the second character where the second domain name uses the other of the first character and the second character, determining to deny performing the operation on the third domain name. After operation 510, the operating procedures of FIG. 5 move to operation 512.

Operation 512 depicts denying an operation on the domain name. In embodiments, operation 512 may be implemented in a similar manner as operation 214 of FIG. 2. After operation 512, the operating procedures of FIG. 5 move to operation 514, where the operating procedures of FIG. 5 end.

Operation 516 is reached from operation 506 where it is determined that performing an OCR test on the domain name does not produce a match with another domain name. Operation 516 depicts allowing an operation on the domain name. In embodiments, operation 516 may be implemented in a similar manner as operation 216 of FIG. 2. After operation 516, the operating procedures of FIG. 5 move to operation 514, where the operating procedures of FIG. 5 end.

Figure 6:
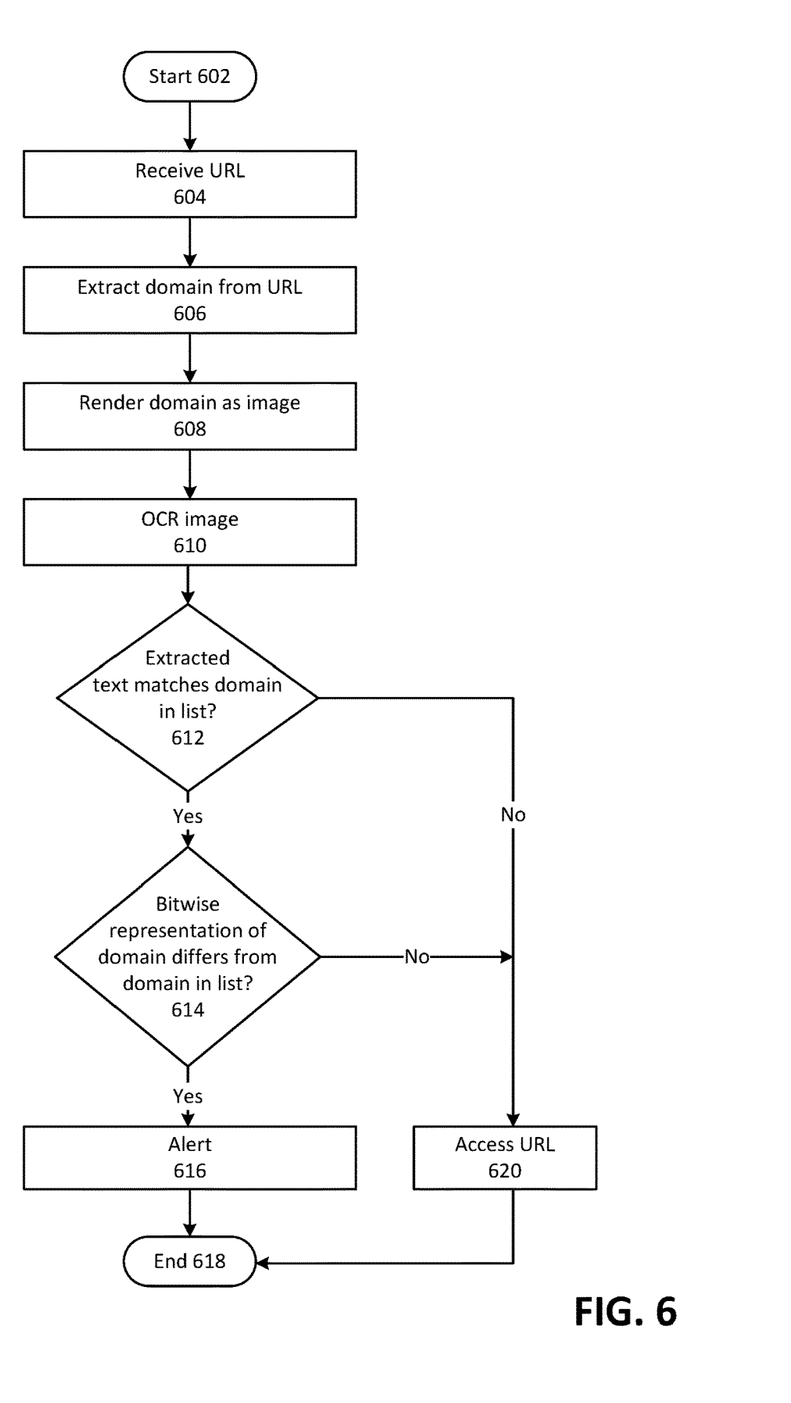
FIG. 6 depicts example operating procedures for identifying visually similar domain names when they are presented to a user.

FIG. 6 depicts example operating procedures for identifying visually similar domain names when they are presented to a user. In embodiments, the operating procedures of FIG. 6 may be implemented by computer 102 of FIG. 1 as it evaluates a domain name or uniform resource locator (URL) to be presented to a user, or that a user has selected, in an attempt to access that domain name or URL. This domain name or URL may indicate another computer that is connected to computer 102 via Internet 104.

The operating procedures of FIG. 6 begin with operation 602 and move to operation 604. Operation 604 depicts receiving a URL. For example, this may be a URL that is displayed in a user interface that a user clicks on, or a URL entered into an address bar of a web browser. After operation 604, the operating procedures of FIG. 6 move to operation 606.

Operation 606 depicts extracting a domain name from the URL received in operation 604. For example, where the URL is http://www.example.com/index.html, the domain name may be determined to be example.com. This may be accomplished, for example, through the use of applying regular expressions to the URL to identify the domain name contained within. After operation 606, the operating procedures of FIG. 6 move to operation 608.

Operation 608 depicts rendering the domain name from operation 606 as an image. In embodiments, operation 608 may be implemented in a similar manner as operation 206 of FIG. 2. After operation 608, the operating procedures of FIG. 6 move to operation 610.

Operation 610 depicts OCR'ing the image from operation 608. In embodiments, operation 610 may be implemented in a similar manner as operation 208 of FIG. 2. After operation 610, the operating procedures of FIG. 6 move to operation 612.

Operation 612 depicts determining whether the extracted text from OCR'ing the image in operation 610 matches a domain name in a list of domain names. In embodiments, operation 612 may be implemented in a similar manner as operations 210-212 of FIG. 2. Where in operation 612 it is determined that the extracted text matches a domain name in the list of domain names, the operating procedures of FIG. 6 move to operation 614. Instead, where in operation 612 it is determined that the extracted text does not match a domain name in the list of domain names, the operating procedures of FIG. 6 move to operation 620.

Operation 614 is reached from operation 620 where it is determined that the extracted text matches a domain name in the list of domain names. Operation 614 depicts determining whether a bitwise representation of the domain name differs from that of the matched domain name in the list of domain names. In embodiments, operation 614 may be implemented in a similar manner as operation 212 of FIG. 2. In embodiments where operation 614 is performed in conjunction with operation 620, this may comprise determining whether the domain name and the first domain name bitwise match; and in response to determining that the domain name and the first domain name bitwise match, performing the operation on the domain name. In embodiments where operation 614 is performed in conjunction with operation 616, this may comprise determining whether the domain name and the first domain name bitwise match; and in response to determining that the domain name and the first domain name do not bitwise match, denying the operation on the domain name.

Where in operation 614 it is determined that a bitwise representation of the domain name differs from that of the matched domain name in the list of domain names, the operating procedures of FIG. 6 move to operation 616. Instead, where in operation 614 it is determined that a bitwise representation of the domain name matches that of the matched domain name in the list of domain names, the operating procedures of FIG. 6 move to operation 620.

Operation 616 is reached from operation 614 where in operation 614 it is determined that a bitwise representation of the domain name differs from that of the matched domain name in the list of domain names. Operation 616 depicts generating an alert. In embodiments where the user is selecting the URL in a user interface, such as described with respect to operation 604, generating an alert may comprise displaying a pop-up dialogue in the user interface that indicates that the URL may be suspicious, and asking the user to confirm that he or she wishes to access it. After operation 616, the operating procedures of FIG. 6 move to operation 618, where the operating procedures of FIG. 6 end.

Operation 620 is reached from operation 612 where it is determined that the extracted text does not match a domain name in the list, or from operation 614 where it is determined that a bitwise representation of the domain name matches that of the matched domain name in the list of domain names. Operation 620 depicts accessing the URL received in operation 604. After operation 620, the operating procedures of FIG. 6 move to operation 618, where the operating procedures of FIG. 6 end.

Figure 7:
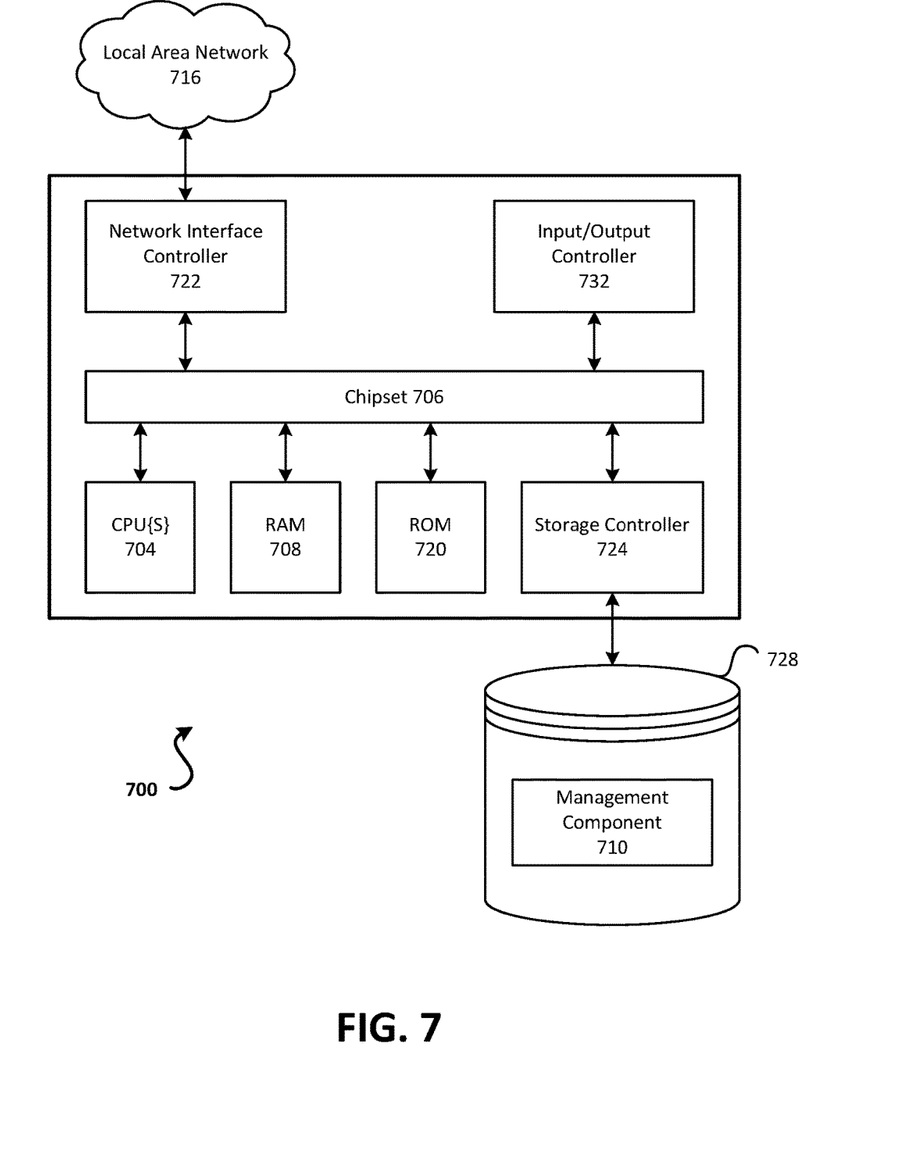
FIG. 7 depicts a computer that may be used to implement aspects of the operating environment of FIG. 1.

FIG. 7 depicts a computer that may be used to implement aspects of the operating environment of FIG. 1. With regard to the example architecture of FIG. 1, computer 102 and domain name manager 106 may each be implemented in an instance of computer 700 of FIG. 7.

The computer architecture shown in FIG. 7 illustrates a conventional server computer, workstation, desktop computer, laptop, tablet, network appliance, PDA, e-reader, digital cellular phone, or other computing node, and may be utilized to execute any aspects of the computers described herein, such as to implement the operating procedures of FIGS. 2-6.

Computer 700 may include a baseboard, or "motherboard," which is a printed circuit board to which a multitude of components or devices may be connected by way of a system bus or other electrical communication paths. One or more central processing units (CPUs) 704 may operate in conjunction with a chipset 706. CPUs 704 may be standard programmable processors that perform arithmetic and logical operations necessary for the operation of computer 700.

CPUs 704 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

Chipset 706 may provide an interface between CPUs 704 and the remainder of the components and devices on the baseboard. Chipset 706 may provide an interface to a random access memory (RAM) 708 used as the main memory in computer 700. Chipset 706 may further provide an interface to a computer-readable storage medium, such as a read-only memory (ROM) 720 or non-volatile RAM (NVRAM) (not shown), for storing basic routines that may help to start up computer 700 and to transfer information between the various components and devices. ROM 720 or NVRAM may also store other software components necessary for the operation of computer 700 in accordance with the embodiments described herein.

Computer 700 may operate in a networked environment using logical connections to remote computing nodes and computer systems through local area network (LAN) 716. Chipset 706 may include functionality for providing network connectivity through a network interface controller (NIC) 722, such as a gigabit Ethernet adapter. NIC 722 may be capable of connecting the computer 700 to other computing nodes over LAN 716. It should be appreciated that multiple NICs 722 may be present in computer 700, connecting the computer to other types of networks and remote computer systems.

Computer 700 may be connected to a mass storage device 728 that provides non-volatile storage for the computer. Mass storage device 728 may store system programs, application programs, other program modules, and data, which have been described in greater detail herein. Mass storage device 728 may be connected to computer 700 through a storage controller 724 connected to chipset 706. Mass storage device 728 may consist of one or more physical storage units. Storage controller 724 may interface with the physical storage units through a serial attached SCSI (SAS) interface, a serial advanced technology attachment (SATA) interface, a fiber channel (FC) interface, or other type of interface for physically connecting and transferring data between computers and physical storage units.

Computer 700 may store data on mass storage device 728 by transforming the physical state of the physical storage units to reflect the information being stored. The specific transformation of a physical state may depend on various factors and on different implementations of this description. Examples of such factors may include, but are not limited to, the technology used to implement the physical storage units and whether mass storage device 728 is characterized as primary or secondary storage and the like.

For example, computer 700 may store information to mass storage device 728 by issuing instructions through storage controller 724 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. Computer 700 may further read information from mass storage device 728 by detecting the physical states or characteristics of one or more particular locations within the physical storage units.

In addition to mass storage device 728 described above, computer 700 may have access to other computer-readable storage media to store and retrieve information, such as program modules, data structures, or other data. It should be appreciated by those skilled in the art that computer-readable storage media can be any available media that provides for the storage of non-transitory data and that may be accessed by computer 700.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM (EPROM), electrically erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage, other magnetic storage devices, or any other medium that can be used to store the desired information in a non-transitory fashion.

Mass storage device 728 may store an operating system utilized to control the operation of the computer 700. According to one embodiment, the operating system comprises a version of the LINUX operating system. According to another embodiment, the operating system comprises a version of the WINDOWS SERVER operating system from the MICROSOFT Corporation. According to further embodiments, the operating system may comprise a version of the UNIX operating system. It should be appreciated that other operating systems may also be utilized. Mass storage device 728 may store other system or application programs and data utilized by computer 700, such as management component 710 and/or the other software components described above.

Mass storage device 728 or other computer-readable storage media may also be encoded with computer-executable instructions, which, when loaded into computer 700, transforms the computer from a general-purpose computing system into a special-purpose computer capable of implementing the embodiments described herein. These computer-executable instructions transform computer 700 by specifying how CPUs 704 transition between states, as described above. Computer 700 may have access to computer-readable storage media storing computer-executable instructions, which, when executed by computer 700, may perform operating procedures depicted in FIGS. 2-6.

Computer 700 may also include an input/output controller 732 for receiving and processing input from a number of input devices, such as a keyboard, a mouse, a touchpad, a touch screen, an electronic stylus, or other type of input device. Similarly, input/output controller 732 may provide output to a display, such as a computer monitor, a flat-panel display, a digital projector, a printer, a plotter, or other type of output device. It will be appreciated that computer 700 may not include all of the components shown in FIG. 7, may include other components that are not explicitly shown in FIG. 7, or may utilize an architecture completely different than that shown in FIG. 7.

As described herein, a computing node may be a physical computing node, such as computer 700 of FIG. 7. A computing node may also be a virtual computing node, such as a virtual machine instance, or a session hosted by a physical computing node, where the computing node is configured to host one or more sessions concurrently.

It should be appreciated that the network topologies illustrated in the figures have been greatly simplified and that many more networks and networking devices may be utilized to interconnect the various computing systems disclosed herein. These network topologies and devices should be apparent to those skilled in the art.

It should also be appreciated that the systems in the figures are merely illustrative and that other implementations might be used. Additionally, it should be appreciated that the functionality disclosed herein might be implemented in software, hardware, or a combination of software and hardware. Other implementations should be apparent to those skilled in the art. It should also be appreciated that a server, gateway, or other computing node may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Each of the operations, processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments.

Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computer-implemented method, comprising:
   receiving a request to access a uniform resource locator (URL);
   performing optical character recognition (OCR) on an at least a portion of the image of the URL to extract text;
   determining whether extracted text from the performed OCR matches a second domain name in a list of domain names;
   performing a bitwise comparison of the domain name in the URL to the second domain name in the list of domain names upon determining that the extracted text matches the second domain name;
   preventing the request to access the URL from proceeding upon determining that the bitwise comparison does not match the second domain name in the list of domain names.

2. The computer-implemented method as recited in claim 1, further comprising:
   rendering the URL as a plurality of images, the URL being rendered with a different font in each image of the plurality of images;
   performing the OCR on each image of the plurality of images.

3. The computer-implemented method as recited in claim 1, further comprising:
   raising an alert upon determining that the bitwise comparison does not match the second domain name in the list of domain names.

4. The computer-implemented method as recited in claim 3, wherein the alert indicates that the domain name is confusingly similar to another domain name.

5. The computer-implemented method as recited in claim 1, further comprising:
   determining that a character of the domain name is confusingly similar with a character of the second domain name based on the bitwise comparison of the domain name and the second domain name;
   storing an association between the first character and the second character.

6. The computer-implemented method as recited in claim 1, wherein the bit-wise comparison comprises comparing Unicode representations.

7. The computer-implemented method as recited in claim 1, wherein the receiving a request to access a uniform resource locator (URL) comprises processing a URL by a web browser.

8. A non-transitory computer-readable storage device having stored thereon computer executable instructions that upon execution on a computing device at least cause the computing device to:
   process a request to access a uniform resource locator (URL);
   extract text from an optical character recognition (OCR) of at least a portion of an image of the URL;
   determine whether extracted text from the OCR matches at least a portion of a second domain name in a list of domain names;
   perform a bitwise comparison of the domain name in the URL to the second domain name in the list of domain names upon determining that the extracted text matches the at least a portion of the second domain name;
   block the request to access the URL upon determining that the bitwise comparison does not match the second domain name in the list of domain names.

9. The non-transitory computer-readable storage device as recited in claim 8 having stored thereon computer executable instructions that upon execution on a computing device at least cause the computing device also to:
   render the URL as a plurality of images, the URL being rendered with a different font in each image of the plurality of images;
   perform the OCR on each image of the plurality of images.

10. The non-transitory computer-readable storage device as recited in claim 8 having stored thereon computer executable instructions that upon execution on a computing device at least cause the computing device also to:
    raise an alert upon determining that the bitwise comparison does not match the second domain name in the list of domain names.

11. The non-transitory computer-readable storage device as recited in claim 10, wherein the alert indicates that the domain name is confusingly similar to another domain name.

12. The non-transitory computer-readable storage device as recited in claim 8 having stored thereon computer executable instructions that upon execution on a computing device at least cause the computing device also to:
    determine that a character of the domain name is confusingly similar with a character of the second domain name based on the bitwise comparison of the domain name and the second domain name.

13. The non-transitory computer-readable storage device as recited in claim 10, wherein the bit-wise comparison comprises comparing Unicode representations.

14. The non-transitory computer-readable storage device as recited in claim 10, wherein the processing a request to access a uniform resource locator (URL) comprises processing a URL by a web browser.

15. A computing device being configured with computer executable instructions that upon execution on a computing device at least cause the computing device to:
   process a request to access a uniform resource locator (URL);
   extract text from an optical character recognition (OCR) of at least a portion of an image of the URL;
   determine whether extracted text from the OCR matches at least a portion of a second domain name in a list of domain names;
   perform a bitwise comparison of the domain name in the URL to the second domain name in the list of domain names upon determining that the extracted text matches the at least a portion of the second domain name;
   block the request to access the URL upon determining that the bitwise comparison does not match the second domain name in the list of domain names.

16. The computing device as recited in claim 15 being configured with computer executable instructions that upon execution on a computing device at least cause the computing device to:
   render the URL as a plurality of images, the URL being rendered with a different font in each image of the plurality of images;
   perform the OCR on each image of the plurality of images.

17. The computing device as recited in claim 15 being configured with computer executable instructions that upon execution on a computing device at least cause the computing device to:
   raise an alert upon determining that the bitwise comparison does not match the second domain name in the list of domain names.

18. The computing device as recited in claim 15, wherein the alert indicates that the domain name is confusingly similar to another domain name.

19. The computing device as recited in claim 15 being configured with computer executable instructions that upon execution on a computing device at least cause the computing device to:
   determine that a character of the domain name is confusingly similar with a character of the second domain name based on the bitwise comparison of the domain name and the second domain name.

20. The computing device as recited in claim 15, wherein the processing a request to access a uniform resource locator (URL) comprises processing a URL by a web browser.

* * * * *